(12) United States Patent
Shen et al.

(10) Patent No.: US 7,986,689 B2
(45) Date of Patent: Jul. 26, 2011

(54) ICMP WITH IP ROUTING INSTANCE INFORMATION

(75) Inventors: Naiming Shen, Santa Clara, CA (US); Enke Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 565 days.

(21) Appl. No.: 11/706,113

(22) Filed: Feb. 13, 2007

(65) Prior Publication Data

US 2008/0107107 A1 May 8, 2008

Related U.S. Application Data

(60) Provisional application No. 60/857,710, filed on Nov. 8, 2006.

(51) Int. Cl.
*H04L 12/28* (2006.01)
*H04L 12/56* (2006.01)
(52) U.S. Cl. ...................................... 370/389
(58) Field of Classification Search .................. None
See application file for complete search history.

(56) References Cited

U.S. PATENT DOCUMENTS

| 7,468,956 | B1* | 12/2008 | Leelanivas et al. | 370/255 |
|---|---|---|---|---|
| 2003/0037165 | A1* | 2/2003 | Shinomiya | 709/238 |
| 2003/0072270 | A1* | 4/2003 | Guerin et al. | 370/254 |
| 2003/0204619 | A1* | 10/2003 | Bays | 709/238 |
| 2003/0214947 | A1* | 11/2003 | Chang | 370/392 |
| 2005/0117598 | A1* | 6/2005 | Iijima et al. | 370/412 |
| 2005/0207410 | A1* | 9/2005 | Adhikari et al. | 370/389 |
| 2006/0159083 | A1* | 7/2006 | Ward et al. | 370/389 |
| 2007/0192501 | A1* | 8/2007 | Kompella | 709/230 |

OTHER PUBLICATIONS

J. Postel, "Internet Control Message Protocol", IETF RFC 792, Sep. 1981.
R. Bonica, "Modifying ICMP to Support Multi-part Messages", IETF draft-bonica-internet-icmp-11, Oct. 5, 2006.

* cited by examiner

*Primary Examiner* — Chirag G Shah
*Assistant Examiner* — Minh-Trang Nguyen
(74) *Attorney, Agent, or Firm* — Cindy Kaplan

(57) ABSTRACT

A method and system for providing routing instance information are disclosed. In one embodiment, the method includes receiving a trace packet at a network device, generating an Internet Control Message Protocol (ICMP) packet in response to the trace packet, and transmitting the ICMP packet. The ICMP packet includes routing instance information contained within the network device.

20 Claims, 9 Drawing Sheets

Class-Num = 5
C-type = 1
Length = 8

Object payload:

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |                           AS Number                           |
   +-+-+-+-+-+-+-+-+-+-+-+-+-+-+-+-+-+-+-+-+-+-+-+-+-+-+-+-+-+-+-+-+
```

FIGURE 3

```
                0               1               2               3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            Area ID                            |
+-+-+-+-+-+-+-+-+-+-+-+-+-+-+-+-+-+-+-+-+-+-+-+-+-+-+-+-+-+-+-+-+
```

FIGURE 5

Class-Num = 5
C-type = 4
Length = 8

Object payload:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Instance ID       |     Reserved    |      Level      |
+-+-+-+-+-+-+-+-+-+-+-+-+-+-+-+-+-+-+-+-+-+-+-+-+-+-+-+-+-+-+-+-+
```

FIGURE 6

Class-Num = 5
C-type = 5
Length = 8

Object payload:

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |                     IGRP or EIGRP AS ID                       |
   +-+-+-+-+-+-+-+-+-+-+-+-+-+-+-+-+-+-+-+-+-+-+-+-+-+-+-+-+-+-+-+-+
```

FIGURE 7

Class-Num = 5
C-type = 6
Length = 8

Object payload:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Reserved              |         VR ID              |
+-+-+-+-+-+-+-+-+-+-+-+-+-+-+-+-+-+-+-+-+-+-+-+-+-+-+-+-+-+-+-+-+
```

FIGURE 8

ICMP WITH IP ROUTING INSTANCE INFORMATION

STATEMENT OF RELATED APPLICATION

The present application claims priority from U.S. Provisional Application No. 60/857,710, entitled ICMP WITH IP ROUTING INSTANCE INFORMATION, and filed on Nov. 8, 2006. The contents of this provisional application are incorporated herein by reference in its entirety.

BACKGROUND OF THE INVENTION

The present disclosure relates generally to utilizing ICMP (Internet Control Message Protocol) to obtain network routing information.

Route tracing is used in communication networks to identify problem areas and provide detailed information about the network. Traceroute is an example of a tool that is used to trace the route of a packet over each hop from a client to a remote host by reporting all router addresses therebetween. Traceroute is widely used in IP networks for troubleshooting and status verification purposes. The traceroute program sends a series of trace packets (probe packets) to an IP address and awaits an ICMP reply. ICMP is described in RFC 792, "Internet Control Message Protocol", DARPA Internet Program Protocol Specification, J. Postel, September 1981, which is incorporated herein by reference in its entirety.

Conventional implementation of traceroute uses only the IP address of an inbound interface or router ID address information attached inside the ICMP packets, and does not provide routing instance information. When using a traceroute tool, it is not obvious where the routing domain boundary is if the interface address is not in a global DNS (Domain Name System) table. This is also the case when the link uses private IP address space. Routing information may be obtained through IGP (Interior Gateway Protocol), however, with increasing demand on QoS (Quality of Service) routing, and with IETF effort on Multi-Topology for IS-IS (Intermediate System to Intermediate System) and OSPF (Open Shortest Path First), IGP troubleshooting has become difficult. Furthermore, methods currently available for discovering routing instance information require access to databases which may not be up to date, may be difficult to access, or require authorization to access information due to security issues. Routing instance information is important for use by network operators in troubleshooting without access to a full local routing database.

BRIEF DESCRIPTION OF THE DRAWINGS

FIG. 3 illustrates an example of an AS number object for use in an ICMP message.

FIG. 5 illustrates an example of an OSPF area ID object for use in an ICMP message.

FIG. 6 illustrates an example of an IS-IS level object for use in an ICMP message.

FIG. 7 illustrates an example of an IGRP or EIGRP AS ID object for use in an ICMP message.

FIG. 8 illustrates an example of a virtual router ID object for use in an ICMP message.

Corresponding reference characters indicate corresponding parts throughout the several views of the drawings.

DESCRIPTION OF EXAMPLE EMBODIMENTS

Overview

In one embodiment, a method for providing routing instance information generally comprises receiving a trace packet at a network device, generating an Internet Control Message Protocol (ICMP) packet in response to the trace packet, and transmitting the ICMP packet. The ICMP packet includes routing instance information contained within the network device.

In one embodiment, an apparatus for providing routing instance information generally comprises a processor configured to receive a trace packet at a network device, generate an Internet Control Message Protocol (ICMP) packet in response to the trace packet, insert routing instance information in the ICMP packet, and transmit the ICMP packet. The apparatus further includes memory for storing said routing instance information.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The embodiments described herein utilize a protocol to define a number of important routing instance objects in a message. This allows network operators to easily identify problems in intra-domain or inter-domain network troubleshooting without searching for a full local routing database. As described below, routing instance information is conveyed in response to a trace packet. The routing information simplifies troubleshooting, makes it easier to identify the correct organization to contact along the path of the packet, and thereby helps users to adapt to multi-topology or multi-instance routing technologies.

Figure 1:
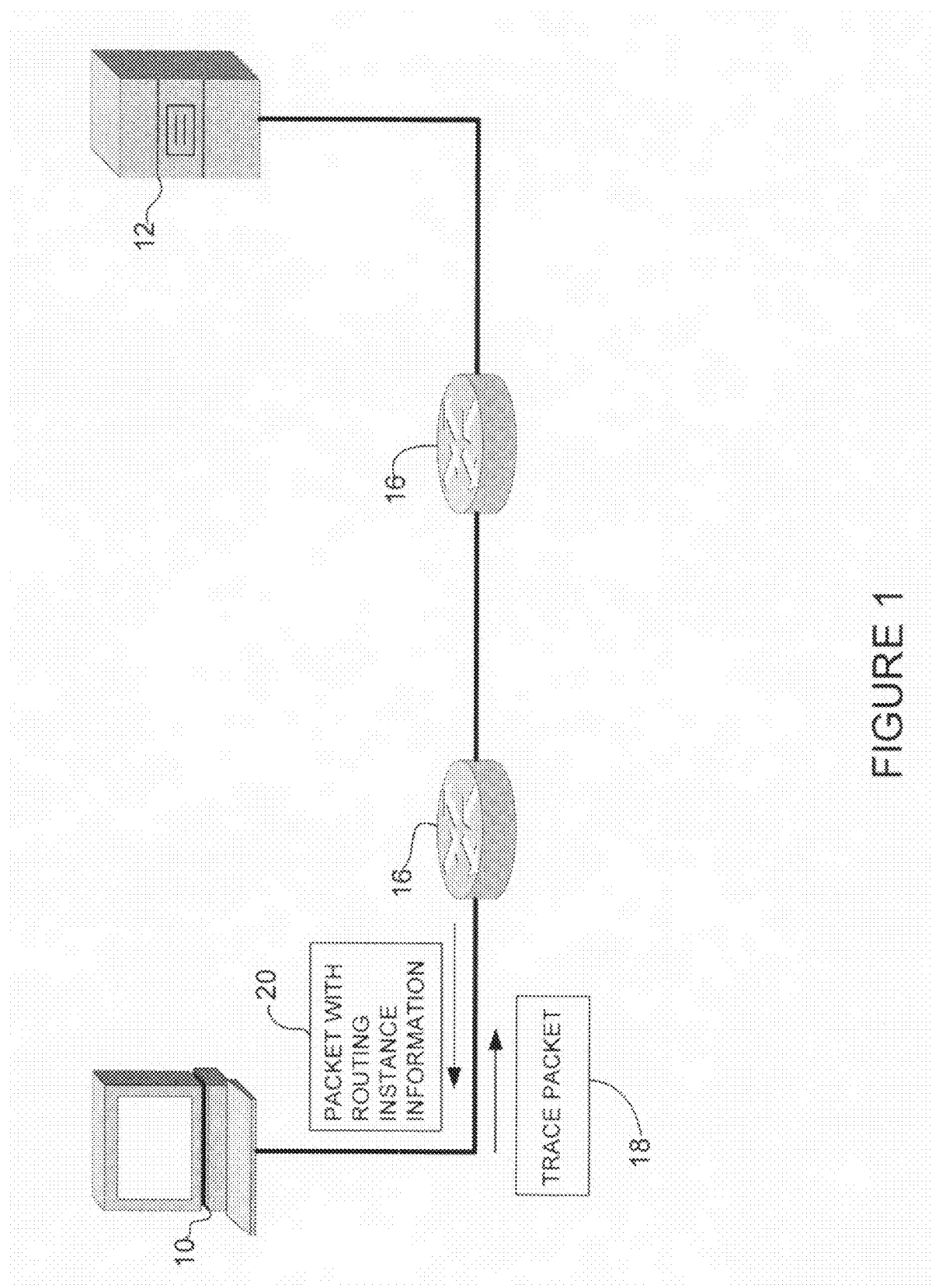
FIG. 1 illustrates an example of a network in which embodiments described herein may be implemented.

Referring now to the drawings, and first to FIG. 1, an example of a network that may implement embodiments described herein is shown. The embodiments operate in the context of a data communication network including multiple network elements. For simplification, only a small number of nodes are shown. Some of the nodes in a network that employs the embodiments may be network devices such as routers or switches. The network device may include, for example, a master central processing unit (CPU), interfaces, and a bus. The CPU preferably includes memory and a processor. The network device may be implemented on a general purpose network host machine such as a computer system or network device described below with respect to FIG. 9.

In the example shown in FIG. 1, a network device (e.g., network management station, personal computer (PC)) 10 is in communication with one or more servers 12 through a network. Communications between the network device 10 and server 12 are routed through one or more routers or switches 16. One or more messages may be sent from the network device 10 to identify a connection path between a source node (e.g., network device 10) and a destination node (e.g., server 12). The source and destination nodes may be any type of host having a data communication capability. It is to be understood that the network shown in FIG. 1 is only one example, and that other network configurations and network devices may be used without departing from the scope of the invention.

In one embodiment, the system utilizes ICMP (Internet Control Message Protocol) multi-part message extension to define a number of important routing instance objects in a message. ICMP multi-part message extension is described in Internet Draft "Modifying ICMP to Support Multi-part Messages", R. Bonica et al., Oct. 5, 2006, which is incorporated herein by reference in its entirety. The ICMP messages are sent in response to a trace packet transmitted, for example, by a traceroute diagnostic tool. It is to be understood that the protocols described herein for the trace packet and response message are provided as examples and that variations to the protocol or diagnostic tool, or other protocols or diagnostic tools may be used without departing from the scope of the invention.

Traceroute may be installed at a network management station or any source node on the network. The source node sends a series of packets with incrementally larger Time-to-Live (TTL) values and then monitors for ICMP Time Exceeded error messages or ICMP Destination Unreachable error messages, as the packets expire on the way to the destination node. The first packet sent by traceroute has a TTL value of one. When the packet is received by the first-hop router on the network, the router is unable to forward the datagram with the TTL value reaching zero, so the router discards the packet and sends an ICMP Time Exceeded error message back to the sender. Traceroute records the IP address of the router that returned the packet and then sends another packet with the TTL field set to two. This time the packet makes it past the first-hop router to the next router in the path. However, since the TTL value is set to one by the first-hop router during the forwarding process, the next-hop router rejects the packet and sends an ICMP Time Exceeded error message back to the source node. This process is repeated until the destination node has been reached. A process according to one embodiment, for providing IP routing instance information in the ICMP Time Exceeded and Destination Unreachable messages used by traceroute is described below and shown in the flowchart of FIG. 2.

Figure 2:
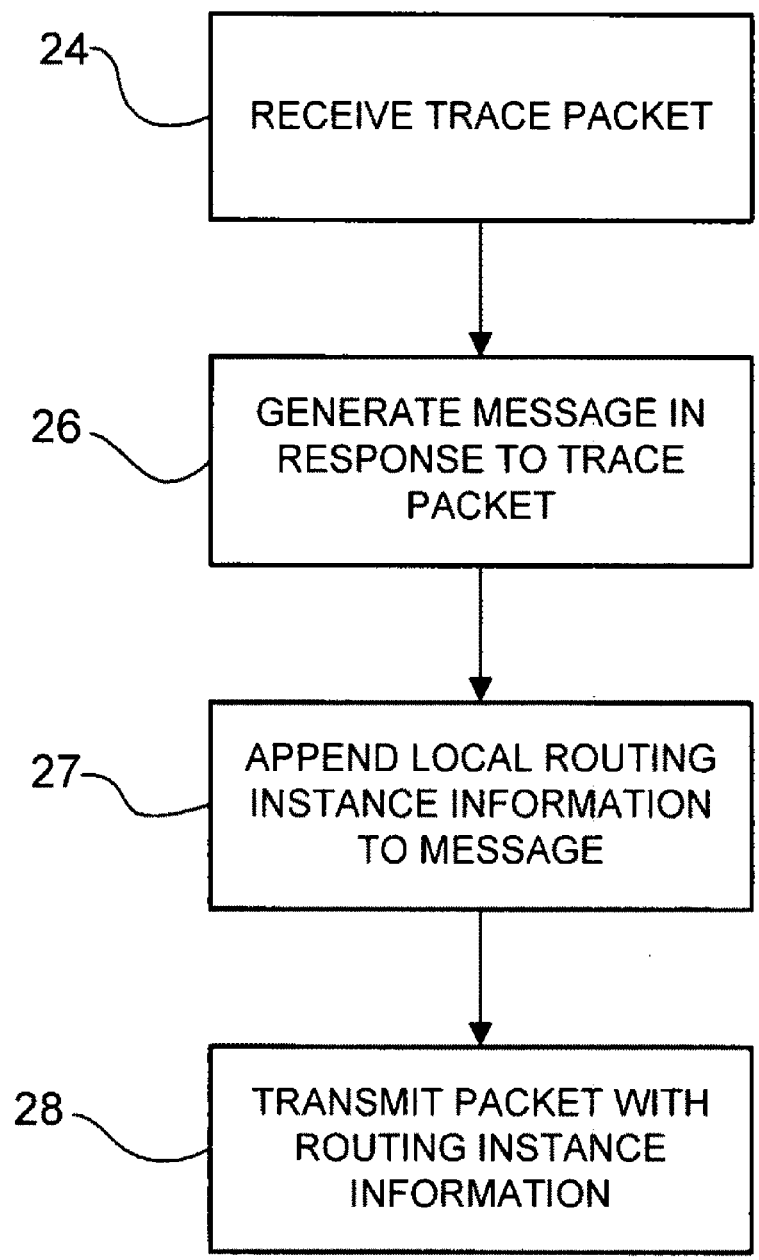
FIG. 2 is a flowchart illustrating a process for providing IP routing instance information using ICMP in accordance with one embodiment.

A trace packet 18 sent by the source node 10, is received by router 16 at step 24 (FIGS. 1 and 2). In one embodiment, the trace packet 18 is an IP datagram addressed to destination node 12 but with the time-to-live (TTL) field set to 1, 2, 3, etc. The first trace packet with TTL=1 reaches router 16. Instead of forwarding the packet, the router 16 generates a message in response to the trace packet (step 26). The response may be, for example, a Time Exceeded or Destination Unreachable ICMP message. The router appends routing instance information to the ICMP message (step 27). The routing instance information is contained locally within the router, thus there is no need for the router to access external databases to obtain the routing instances. The specific routing information inserted into the packet may depend on a local policy at the router or may be specified in the ICMP traceroute packet. The router 16 transmits the packet 20 to the source node 10 for use by traceroute (or other diagnostic application) at the source node (step 28). This process is repeated until the source node 10 sends a datagram that reaches destination node 12. The source node combines the information from all of the response packets and can use this information to create a report on the route and specific routing instance information obtained from the nodes 16 within the connection path to the destination node 12.

In one embodiment, routing instance information comprises one or more of the following: path of routing domain AS (Autonomous System) number, Multi-Topology MT) identifier, OSPF (Open Shortest Path First) area, IS-IS levels, IGRP (Interior Gateway Routing Protocol)/EIGRP (Enhanced IGRP) AS identifier, and VRRP (Virtual Router Redundancy Protocol) identifier. Any combination of the above routing instance information or other routing instance information may be provided by the system and method described herein. This information can be used, for example, by network operators that do not have the full local routing information available during network troubleshooting.

The information is preferably appended to the ICMP Time Exceeded or Destination Unreachable messages. In one embodiment, the Time Exceeded and Destination Unreachable messages conform to the Internet Draft for "Modifying ICMP to Support Multi-part Messages", referenced above. The Time Exceeded message includes the following fields: Type, Code, Checksum, Length, Internet Header+leading octets of original datagram, and an extension object, which includes the routing instance information. The Destination Unreachable message preferably includes the same fields as the Time Exceeded message plus a Next-HOP MTU field. An ICMP Extension Structure Header follows the octets from the original datagram and comes before any ICMP Extension Objects. The Extension Object contains one or more 32-bit words, representing an object header and payload.

The following describes examples of ICMP routing instance objects that can be optionally appended to the ICMP Time Exceeded or Destination Unreachable message, in accordance with one embodiment.

When using a traceroute diagnostic tool through multiple routing domains, it is useful to have the ICMP Time Exceeded or ICMP Destination Unreachable messages include the AS number that the router or virtual router belongs to. The router may include the AS number when sending out the ICMP messages, as shown in FIG. 3.

Figure 4:
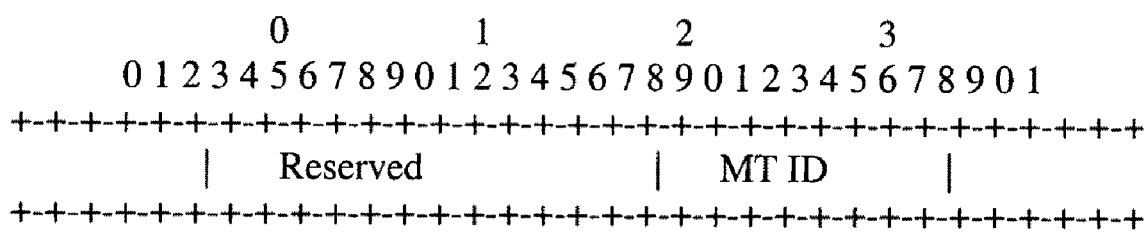
FIG. 4 illustrates an example of an MT ID object for use in an ICMP message.

Within the same routing domain, if a network operates with multiple topologies for IGP, it is useful in network troubleshooting to know the Multi-Topology (MT) identifier the traceroute packet of inbound interface is associated with. The router may include the MT ID when sending out the ICMP messages, as shown in FIG. 4. In one example, the MT ID is a 12 bit number for IS-IS MT, and it is a 7 bit number for OSPF.

Figure 5:
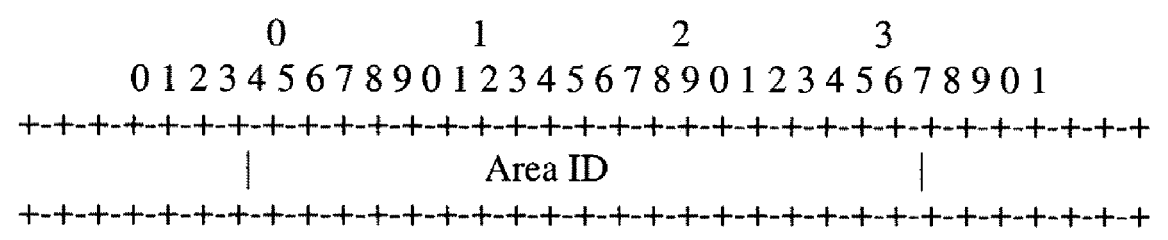

With traditional IGP diagnostics, it is useful for the ICMP Time Exceeded or ICMP Destination Unreachable messages to report the OSPF area that the router belongs to or to report the IS-IS level the router or links belong to when the IGP is IS-IS. The OSPF area and IS-IS level can also belong to a specific routing instance the inbound interface is associated with for the traceroute packets. The router may include the OSPF area ID for OSPF when sending out the ICMP messages, as shown in FIG. 5.

The router may include the IS-IS level when sending out the ICMP messages, as shown in FIG. 6. The instance ID is a 16 bit number. The default value is zero. The Level is an 8 bit number, which may be defined as follows, according to one embodiment:

1—IS-IS level—1
2—IS-IS level—2
3—IS-IS level—1-2

The router may include the IGRP AS ID or EIGRP AS Number when sending out the ICMP messages, as shown in FIG. 7.

A router may support VRRP over a LAN (Local Area Network) interface and it is informative to know if the interface has redundancy protection and its configured VRID (Virtual Router Identifier). The router may include the virtual router identifier of VRRP when sending out the ICMP messages, as shown in FIG. 8. In one embodiment, the virtual router ID is an 8 bit number.

These ICMP extensions provide operators with additional routing information during network troubleshooting. It may be desirable to provide this information only to network operators, in particular for the IGP routing related objects. The implementation is preferably designed to allow configuration of the policy control over the operation of the objects. For example, an access list can be attached to check the IP destination of the ICMP packets with this extension belonging to an internal network management subnet.

Figure 9:
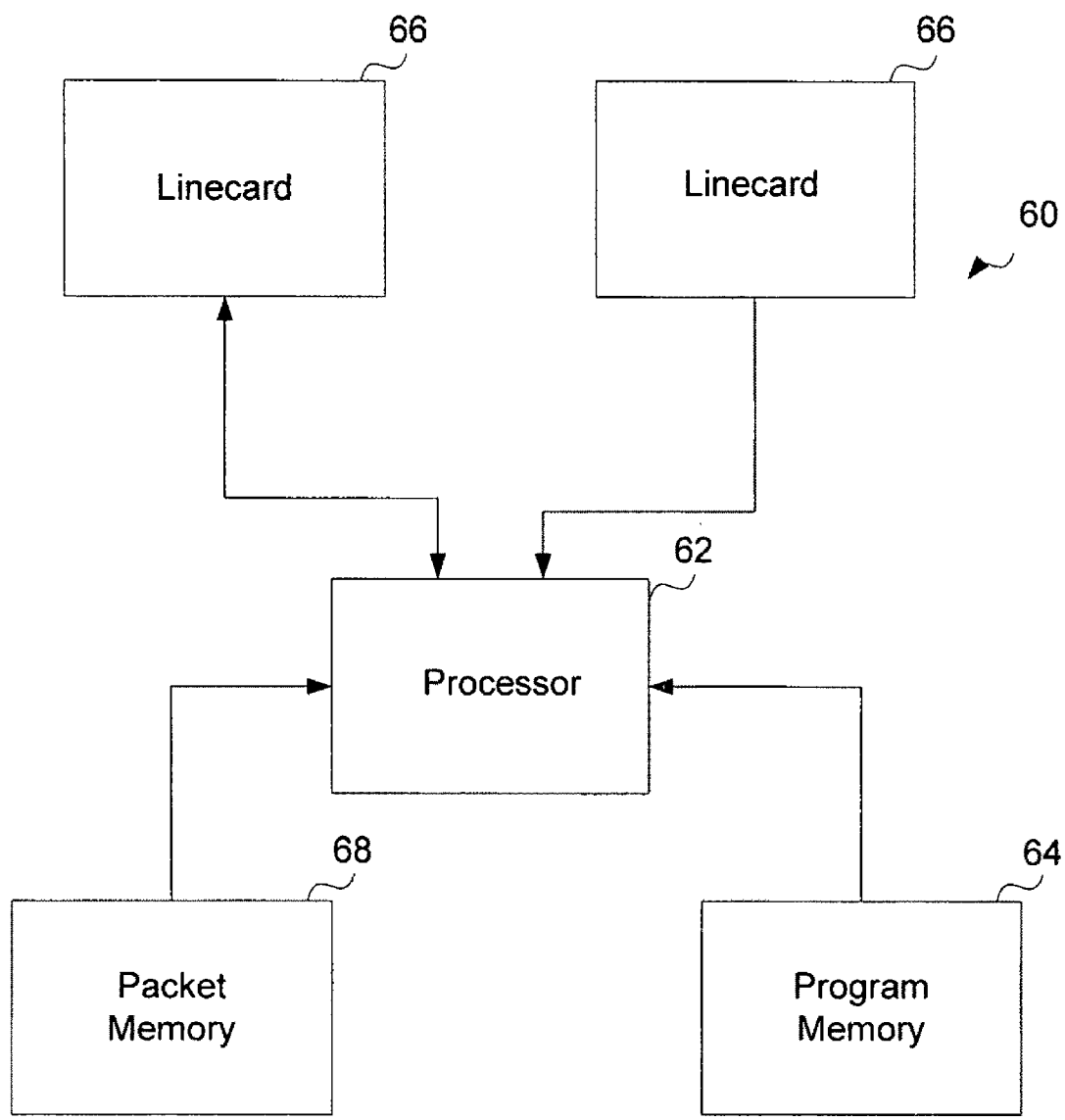
FIG. 9 depicts an example of a network device useful in implementing embodiments described herein.

FIG. 9 depicts a network device 60 that may be used to implement embodiments described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for providing routing instance information, comprising:
    receiving a trace packet at a network device;
    generating an Internet Control Message Protocol (ICMP) packet in response to the trace packet, the ICMP packet comprising routing instance information contained within the network device; and
    transmitting the ICMP packet;
    wherein said routing instance information comprises a Multi-Topology identifier identifying the topology that an interface receiving the trace packet is associated with, and further comprising an Open Shortest Path First (OSPF) area identifying the area in which the network device belongs or an Intermediate System to Intermediate System (IS-IS) level identifying the level in which the network device belongs.

2. The method of claim 1 wherein generating an ICMP packet comprises generating a Time Exceeded message.

3. The method of claim 1 wherein generating an ICMP packet comprises generating a Destination Unreachable message.

4. The method of claim 1 wherein said routing instance information comprises an Autonomous System (AS) number.

5. The method of claim 1 wherein said routing instance information comprises an IGRP (Interior Gateway Routing Protocol) or EIGRP (Enhanced IGRP) AS number.

6. The method of claim 1 wherein said routing instance information comprises a virtual router identifier.

7. The method of claim 1 wherein the ICMP packet comprises an ICMP time exceeded or destination unreachable message and wherein the routing instance information is appended to the ICMP message.

8. Apparatus for providing routing instance information, comprising:
    a processor configured to receive a trace packet at a network device, generate an Internet Control Message Protocol (ICMP) packet in response to the trace packet, insert routing instance information in the ICMP packet, and transmit the ICMP packet; and
    memory for storing said routing instance information;
    wherein said routing instance information comprises a Multi-Topology identifier identifying the topology that an interface receiving the trace packet is associated with, and further comprising an Open Shortest Path First (OSPF) area identifying the area in which the network device belongs or Intermediate System to Intermediate System (IS-IS) level identifying the level in which the network device belongs.

9. The apparatus of claim 8 wherein the memory stores instructions specifying the routing instance information to insert into the ICMP packet.

10. The apparatus of claim 8 wherein said routing instance information comprises an AS (Autonomous System) number.

11. The apparatus of claim 8 wherein said routing instance information comprises an IGRP (Interior Gateway Routing Protocol) or EIGRP (Enhanced IGRP) AS number.

12. The apparatus of claim 8 wherein said routing instance information comprises a virtual router identifier.

13. The apparatus of claim 8 wherein said routing instance information is used by a routing protocol.

14. The apparatus of claim 8 wherein said routing instance information identifies a routing domain of the network device.

15. The apparatus of claim 8 wherein said routing instance information is contained within said network device.

16. The apparatus of claim 8 wherein said routing instance information is selected based on a policy at the network device or information contained within the trace packet.

17. The apparatus of claim 8 wherein the ICMP packet comprises an ICMP time exceeded or destination unreachable message and wherein the routing instance information is appended to the ICMP message.

18. A system for providing routing instance information, comprising:
    means for receiving a trace packet at a network device;
    means for generating an Internet Control Message Protocol (ICMP) packet in response to the trace packet, the ICMP packet comprising routing instance information contained within the network device; and means for transmitting the ICMP packet;

wherein said routing instance information comprises a Multi-Topology identifier identifying the topology that an interface receiving the trace packet is associated with, and further comprising an Open Shortest Path First (OSPF) area identifying the area in which the network device belongs or an Intermediate System to Intermediate System (IS-IS) level identifying the level in which the network device belongs.

19. The system of claim 18 wherein said ICMP packet is a Time Exceeded message.

20. The system of claim 18 wherein said ICMP packet is a Destination Unreachable message.

* * * * *